(12) United States Patent
Rejda et al.

(10) Patent No.: US 11,389,924 B2
(45) Date of Patent: Jul. 19, 2022

(54) METHODS OF LAPPING WHILE HEATING ONE OR MORE FEATURES, AND RELATED SLIDERS, ROW BARS, AND SYSTEMS

(71) Applicant: Seagate Technology LLC, Cupertino, CA (US)

(72) Inventors: Edwin Rejda, Bloomington, MN (US); Andrew Habermas, Bloomington, MN (US); Jeff O'Konski, Savage, MN (US); Andrew Sherve, Minneapolis, MN (US); Michael Thomas Johnson, Minneapolis, MN (US); Dongming Liu, Eden Prairie, MN (US)

(73) Assignee: Seagate Technology LLC, Fremont, CA (US)

( * ) Notice: Subject to any disclaimer, the term of this patent is extended or adjusted under 35 U.S.C. 154(b) by 419 days.

(21) Appl. No.: 16/434,853

(22) Filed: Jun. 7, 2019

(65) Prior Publication Data

US 2019/0381629 A1    Dec. 19, 2019

Related U.S. Application Data

(60) Provisional application No. 62/686,433, filed on Jun. 18, 2018.

(51) Int. Cl.
*G11B 5/31*    (2006.01)
*B24B 37/04*    (2012.01)

(52) U.S. Cl.
CPC .......... *B24B 37/048* (2013.01); *G11B 5/3169* (2013.01)

(58) Field of Classification Search
None
See application file for complete search history.

(56) References Cited

U.S. PATENT DOCUMENTS 6,093,083 A * 7/2000 Lackey ................. B24B 37/048
29/603.16
6,123,608 A    9/2000 Nakagawa et al.
(Continued)

FOREIGN PATENT DOCUMENTS

CN    1274458 A    11/2000
CN    101174417 A    5/2008
(Continued)

OTHER PUBLICATIONS

First Chinese Office Action, and English Translation thereof, for Chinese Counterpart Application No. 201910526588.7, dated Jan. 13, 2021, (16 pages).
(Continued)

*Primary Examiner* — William J Klimowicz
(74) *Attorney, Agent, or Firm* — Kagan Binder, PLLC

(57) ABSTRACT

The present disclosure includes methods of lapping that include energizing one or more elements that are located proximal to a first magnetoresistive element in a transducer region and generate heat and cause the first magnetoresistive element to selectively expand in the lapping direction relative to one or more other magnetoresistive elements. The present disclosure also includes methods of lapping that use one or more thermal sensors located proximal to the first magnetoresistive element to help control lapping in the lapping direction. The present disclosure includes related lapping systems and sliders.

15 Claims, 7 Drawing Sheets

(56) References Cited

U.S. PATENT DOCUMENTS

| | | | |
|---|---|---|---|
| 6,347,983 B1 * | 2/2002 | Hao | B24B 37/04 |
| | | | 29/603.09 |
| 6,627,909 B2 | 9/2003 | Khlif | |
| 6,679,762 B2 | 1/2004 | Fatula, Jr. et al. | |
| 6,831,249 B2 | 12/2004 | Tam et al. | |
| 6,857,937 B2 | 2/2005 | Bajorek | |
| 7,086,931 B2 | 8/2006 | Oyama et al. | |
| 7,362,533 B2 | 4/2008 | Stipe | |
| 7,388,726 B1 | 6/2008 | McKenzie et al. | |
| 7,495,856 B2 | 2/2009 | Payne et al. | |
| 7,551,406 B1 | 6/2009 | Thomas et al. | |
| 7,643,250 B2 | 1/2010 | Araki et al. | |
| 7,911,736 B2 | 3/2011 | Bajorek | |
| 8,165,709 B1 | 4/2012 | Rudy | |
| 8,208,350 B1 | 6/2012 | Hu et al. | |
| 8,456,969 B1 | 6/2013 | Mooney et al. | |
| 8,501,536 B2 | 8/2013 | Mooney | |
| 8,638,349 B1 | 1/2014 | Liu et al. | |
| 8,810,947 B1 | 8/2014 | Ren et al. | |
| 9,153,260 B1 | 10/2015 | Rudy et al. | |
| 9,776,299 B2 | 10/2017 | Herendeen | |
| 10,290,314 B1 * | 5/2019 | O'Konski | G11B 5/3169 |
| 10,493,591 B1 * | 12/2019 | Kunkel | B24B 37/048 |
| 11,037,585 B2 * | 6/2021 | Wessel | G11B 5/3169 |
| 11,037,586 B1 | 6/2021 | Sherve et al. | |
| 2002/0155794 A1 | 10/2002 | Fatula, Jr. et al. | |
| 2003/0065992 A1 | 4/2003 | Yang | |
| 2004/0075940 A1 * | 4/2004 | Bajorek | G11B 5/3173 |
| | | | 360/110 |
| 2004/0235394 A1 | 11/2004 | Ota et al. | |
| 2005/0164607 A1 | 7/2005 | Bajorek | |
| 2006/0168798 A1 | 8/2006 | Naka | |
| 2007/0109686 A1 | 5/2007 | Jose et al. | |
| 2007/0278217 A1 | 12/2007 | Daimatsu et al. | |
| 2010/0134915 A1 * | 6/2010 | Sasaki | G11B 5/314 |
| | | | 360/59 |
| 2010/0157477 A1 | 6/2010 | Morinaga et al. | |
| 2010/0208391 A1 | 8/2010 | Gokemeijer | |
| 2011/0113620 A1 | 5/2011 | Sasaki et al. | |
| 2014/0273764 A1 * | 9/2014 | Ronshaugen | B24B 37/27 |
| | | | 451/57 |
| 2015/0258655 A1 | 9/2015 | Koon et al. | |
| 2015/0262596 A1 * | 9/2015 | Zuckerman | G11B 5/607 |
| | | | 369/13.13 |
| 2016/0064029 A1 * | 3/2016 | Zuckerman | G11B 5/4866 |
| | | | 369/13.26 |
| 2019/0381628 A1 * | 12/2019 | Habermas | G11B 5/3163 |
| 2021/0343310 A1 * | 11/2021 | Bergerud | G11B 5/6082 |

FOREIGN PATENT DOCUMENTS

| | | |
|---|---|---|
| EP | 0362072 A2 | 4/1990 |
| WO | 0237480 A1 | 5/2002 |

OTHER PUBLICATIONS

Unpublished Utility U.S. Appl. No. 16/383,083, filed Apr. 12, 2019 (no attachment).

Unpublished Utility U.S. Appl. No. 16/430,540, filed Jun. 4, 2019 (no attachment).

Unpublished Utility U.S. Appl. No. 15/807,249, filed Nov. 8, 2017 (no attachment).

* cited by examiner

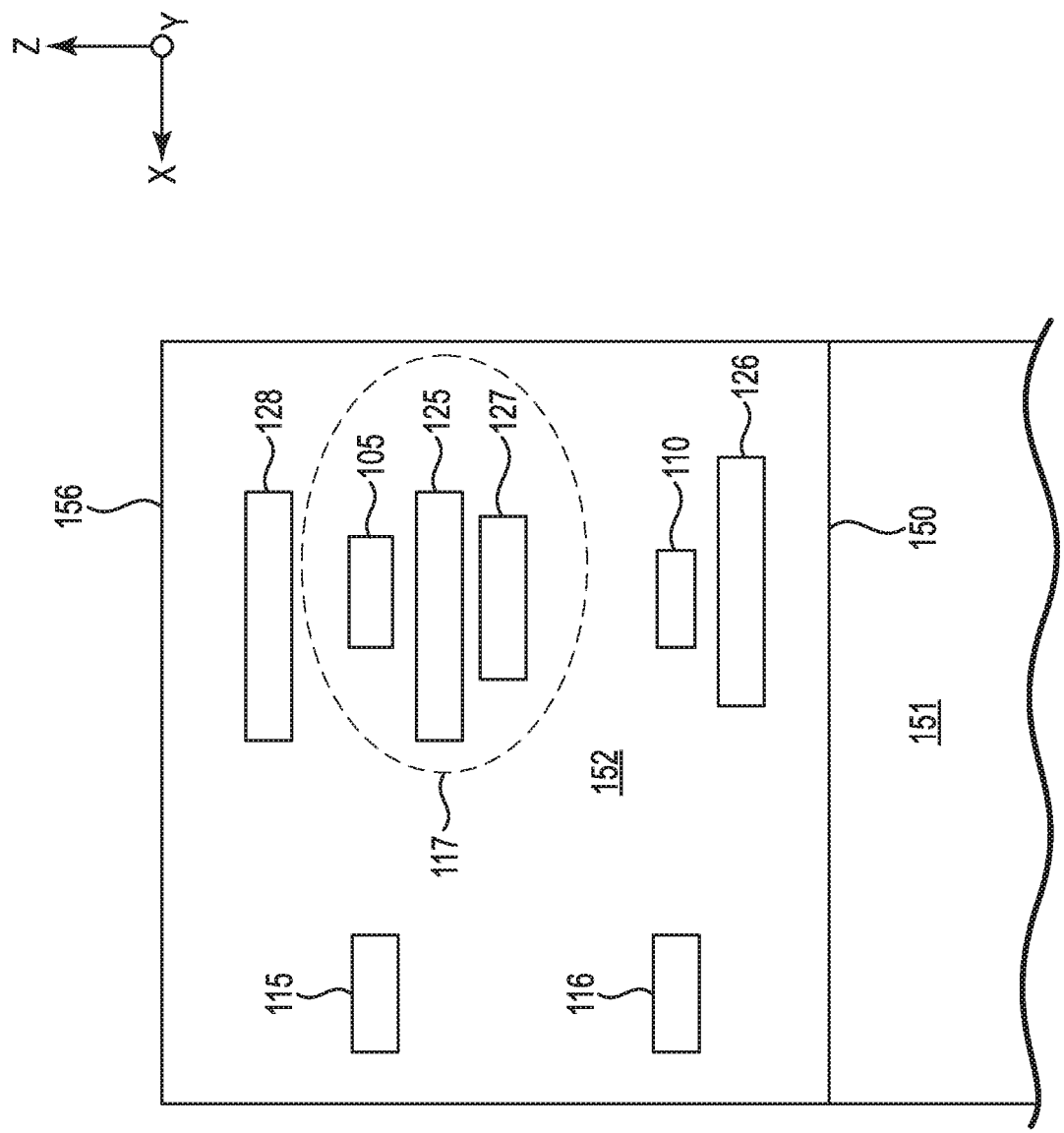

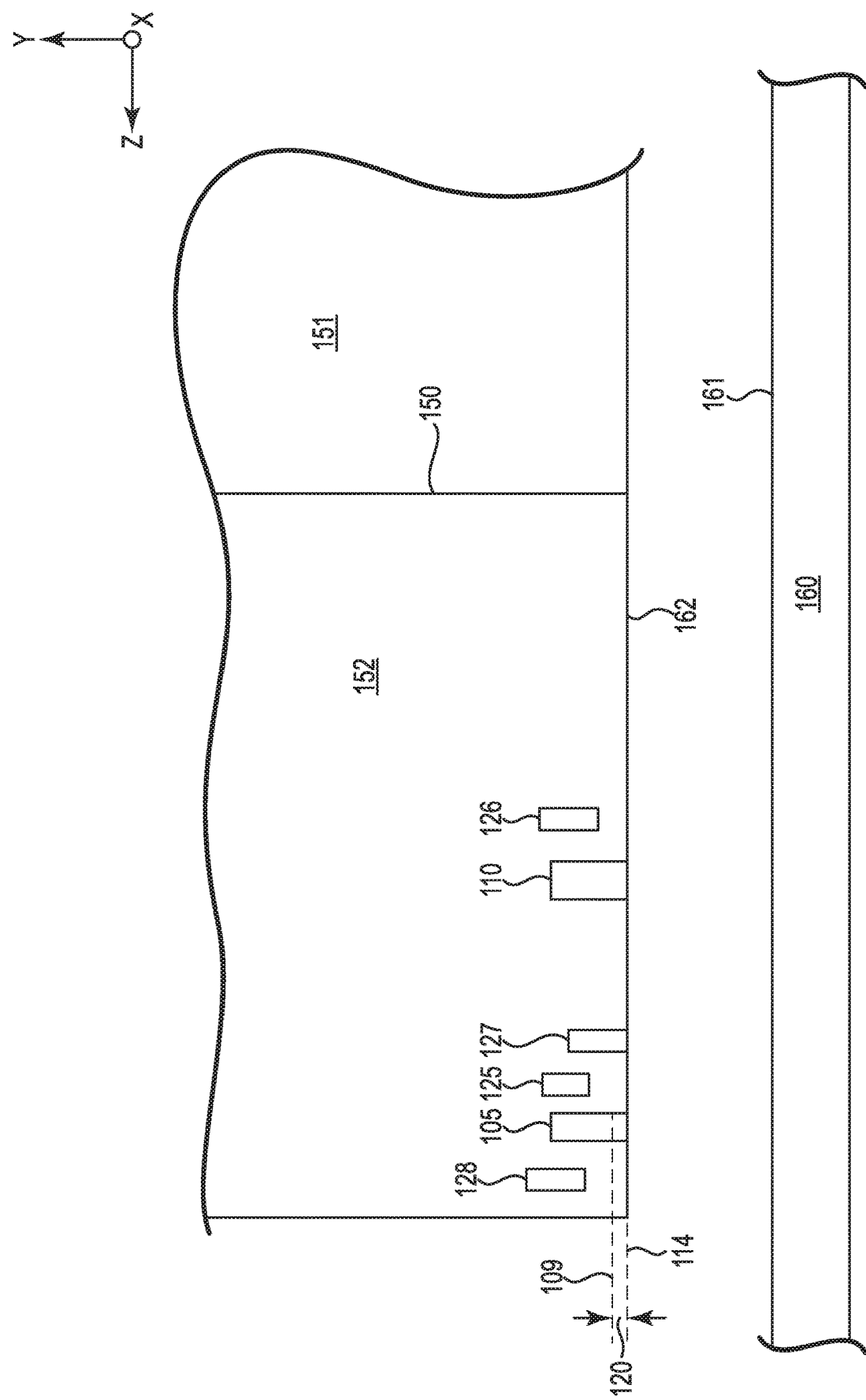

US 11,389,924 B2

METHODS OF LAPPING WHILE HEATING ONE OR MORE FEATURES, AND RELATED SLIDERS, ROW BARS, AND SYSTEMS

RELATED APPLICATION

The present nonprovisional patent application claims the benefit of commonly owned provisional Application having Ser. No. 62/686,433, filed on Jun. 18, 2018, which provisional Application is incorporated herein by reference in its entirety.

BACKGROUND

The present disclosure relates to systems and methods of lapping a slider and/or row bar of sliders that can ultimately be used in a hard disc drive for read/write operations.

SUMMARY

The present disclosure includes embodiments of a method of lapping a row bar having a plurality of sliders, wherein the method comprises:
  a) providing the row bar having a plurality of sliders, wherein at least one slider comprises a transducer region comprising: at least a first magnetoresistive element and a second magnetoresistive element, wherein the first magnetoresistive element has a first feature that has a first distance from a first target value in the lapping direction and the second magnetoresistive element has a second feature that has a second distance from a second target value in the lapping direction, wherein the first distance minus the second distance is equal to a delta distance; and b) applying a current to an element in the transducer region to generate heat and cause at least the first magnetoresistive element to expand in the lapping direction relative to the second magnetoresistive element, wherein the current is controlled to cause the first magnetoresistive element to expand in the lapping direction an amount equal to the delta distance; and c) lapping the row bar while applying the current.

The present disclosure also includes embodiments of a row bar having a plurality of sliders, wherein at least one slider comprises a transducer region, wherein the transducer region comprises:
  a) a magnetoresistive writer element;
  b) a magnetoresistive reader element;
  c) at least one electrical resistance heating element and/or at least one thermal sensor located proximal to the magnetoresistive reader element and/or the magnetoresistive writer element;
  d) a first row of a plurality of electrical contact pads; and
  e) a second row of a plurality of electrical contact pads, wherein the first row of electrical contact pads extends along a downtrack direction at a first position in a lapping direction, wherein the second row of electrical contact pads extends along the downtrack direction at a second position in the lapping direction, wherein the at least one electrical resistance heating element and/or at least one thermal sensor is electrically coupled to at least one electrical contact pad in the second row, and wherein the at least one electrical contact pad in the second row is electrically coupled to at least one electrical contact pad in the first row.

The present disclosure also includes embodiments of a lapping system comprising:
  a) a carrier structure;
  b) the row bar of claim 16, wherein the row bar is removably mounted to the carrier, wherein the carrier structure has a mechanical actuator that is configured to physically contact the row bar and actuate a slider in the lapping direction; and
  c) a lapping plate having a lapping surface that is operable to rotate and contact the row bar for lapping the first magnetoresistive element and the second magnetoresistive element.

The present disclosure also includes embodiments of a row bar having a plurality of sliders, wherein at least one slider comprises a transducer region, wherein the transducer region comprises:
  a) a magnetoresistive writer element;
  b) a first electrical resistance heating element located proximal to the magnetoresistive writer element;
  c) a magnetoresistive reader element;
  d) a second electrical resistance heating element located proximal to the magnetoresistive reader element; and
  e) a third electrical resistance heating element located proximal to the magnetoresistive writer element or the magnetoresistive reader element.

The present disclosure also includes embodiments of a lapping system comprising:
  a) a carrier structure;
  b) the row bar of claim 18, wherein the row bar is removably mounted to the carrier, wherein the carrier structure has a mechanical actuator that is configured to physically contact the row bar and actuate a slider in the lapping direction; and
  c) a lapping plate having a lapping surface that is operable to rotate and contact the row bar for lapping the first magnetoresistive element and the second magnetoresistive element.

BRIEF DESCRIPTION OF THE DRAWINGS

FIG. 1E shows a schematic, bottom view of the portion of the slider shown in FIG. 1D;

FIG. 1F shows a schematic, cross-section view of the portion of the slider shown in FIG. 1D after the slider has been lapped;

DETAILED DESCRIPTION

Figure 1A:
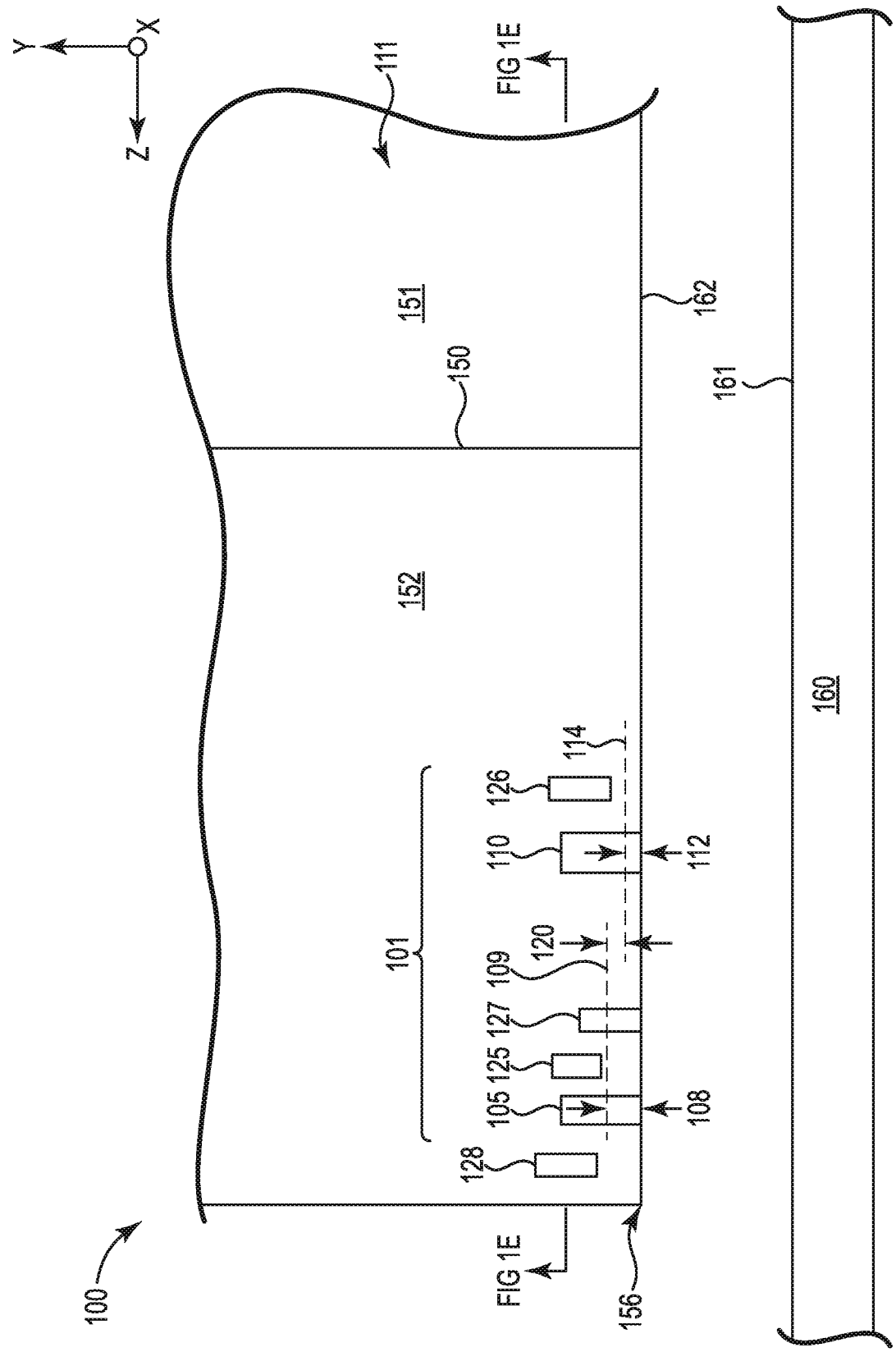
FIG. 1A shows a schematic, cross-section view of a portion of a slider in a row bar that can be lapped according to the present disclosure.

A magnetic recording apparatus can be referred to as a hard disk drive (HDD) and includes a slider that flies above a disk by using air as a lubricant (an "air bearing"). For example, a disk can be placed on a spindle motor that can rotate and a negative pressure air-lubricated bearing slider can be attached at a suspension to correspond to the magnetic disk. The negative pressure air-lubricated bearing slider can be moved by an actuator that pivots so that the slider moves to a desired position on a track of the disk. The disk used as a recording medium has a circular shape and different information can be recorded on each track. In general, to obtain desired information, the slider moves in search of a corresponding track on the disk. The disk can have a magnetic layer that is susceptible to physical and/or chemical damage. To help mitigate such damage, such a disc often has a coating such as Diamond-like Carbon (DLC) as an overcoat to help protect the magnetic layer from physically and/or chemically induced damage.

A lapping tool is used for machining a surface of a row bar that can be later sliced into a plurality of individual sliders. The lapping tool can have a rotating lapping plate defining a lapping surface which can help abrade the surface of a slider. If desired, a slurry can be applied to the lapping surface to enhance the abrading action as the lapping surface is rotated relative to a row bar containing a plurality of the sliders held in a pressing engagement against the lapping surface. Lapping a row bar of sliders permits multiple slider bodies to be processed together, which can advantageously be relatively simple, precise and/or cost-effective. Lapping can involve multiple lapping steps such as rough lapping and final (kiss) lapping. At a desired point in manufacturing, individual sliders can be sliced from the row bar and ultimately used in a hard disk drive.

Rough Lapping can be considered a relatively coarse lapping procedure used to remove relatively more material as compared to kiss lapping. For example, rough lapping can remove up to 10 micrometers of material from a row bar in the lapping direction, or even up to 20 micrometers of material from a row bar in the lapping direction. A row bar can be tilted at a specific position relative to the lapping plate to target a particular element (e.g., reader or writer).

Kiss Lapping can be considered a fine lapping procedure and can be used to remove fractions of material from a row bar as compared to rough lapping. For example, kiss lapping can remove 0.5 microns or less, or even 0.1 microns or less of material from a row bar in the lapping direction.

After rough lapping, but before kiss lapping, two or more electronic features in the transducer region of a given slider may be at different distances from their target values in the lapping direction. For example, before kiss lapping, a magnetoresistive writer element (also referred to as a "writer") may be at a different distance from its target value as compared to a magnetoresistive reader element (also referred to as a "reader"), thereby creating a delta distance (also referred to as a reader/writer delta). Lapping to each target value of a writer and reader during kiss lapping can be difficult when a reader/writer delta is present.

According to the present disclosure, a heat source in the transducer region of a slider can be used to selectively expand an electronic feature (e.g., a writer) relative to another feature (e.g., a reader) within a given slider so that the expanded portion can be removed, thereby reducing or eliminating the delta distance. For example, a writer could be expanded an amount in the lapping direction equal to the reader/writer delta so that that amount could be removed via lapping, thereby removing the reader/writer delta.

The present disclosure can be applied to a variety of slider heads such as perpendicular magnetoresistive (PMR) heads, head-assisted magnetoresistive (HAMR) heads, and the like. In some embodiments, the present disclosure can be especially useful with respect to PMR heads because the accuracy of the write pole width can be very desirable, especially as the write pole width is reduced and the flare angle is increased.

Embodiments of the present disclosure can include a row bar having a plurality of sliders. At least one slider includes a transducer region. The transducer region includes at least a first magnetoresistive element and a second magnetoresistive element. The first magnetoresistive element has a first feature that has a first distance from a first target value in the lapping direction. The second magnetoresistive element has a second feature that has a second distance from a second target value in the lapping direction. The first distance minus the second distance is equal to a delta distance. In some embodiments, a similar relationship among every first magnetoresistive element and second magnetoresistive element is present in every slider in the row bar. That is, every slider in a row bar includes at least a first magnetoresistive element and a second magnetoresistive element. The first magnetoresistive element in each slider has a first feature that is a first distance from a first target value in the lapping direction. The second magnetoresistive element in each slider has a second feature that is a second distance from a second target value in the lapping direction. And the first distance minus the second distance is equal to a delta distance. The delta distance may be the same or different among individual sliders.

In more detail, for illustration purposes, an embodiment according to the present disclosure is described with respect to FIGS. 1A-1G where the first magnetoresistive element is a magnetoresistive writer element (writer) and the second magnetoresistive element is a magnetoresistive reader element (reader).

As used herein, the direction along x-axis (into the page of FIG. 1A) is referred to as the cross-track axis. The direction along the z-axis is referred to herein as the down-track axis, with reference to trailing edge 156. The direction along the y-axis is referred herein as the lapping direction (direction of material removal) or the reader stripe height direction and writer break-point direction.

As shown in FIG. 1A, one slider 111 of a plurality of sliders in row bar 100 is illustrated. Slider 111 includes a transducer region 101 having at least a magnetoresistive writer element 105 and a magnetoresistive reader element 110. In some embodiments, a row bar according to the present disclosure can include at least 30 sliders, at least 60 sliders, or even at least 70 sliders. A slider according to the present disclosure can be mostly made out of ceramic material. As shown in FIG. 1A slider 111 includes an "AlTiC break" 150. The area 151 to the right of break 150, the bulk of the material is alumina titanium-carbide (also referred to as AlTiC). The area 152 to the left of break 150, the bulk of the material, with the exception of many of the features in the transducer region 101, is alumina. Elements such as magnetoresistive writer element 105 are made of magnetic materials such cobalt-iron (CoFe), nickel-iron (NiFe), and the like.

Figure 1C:
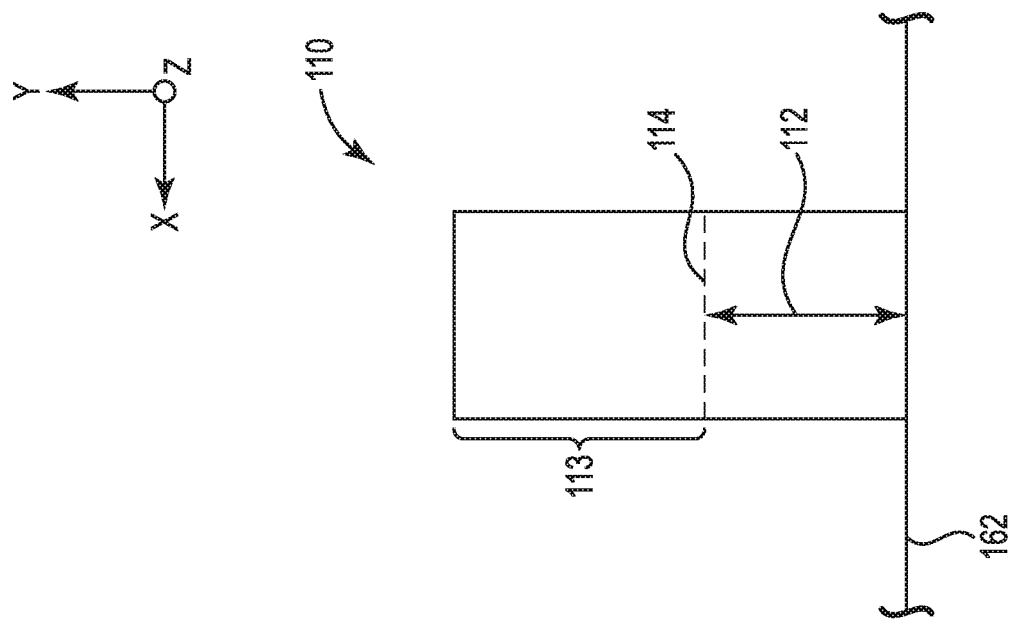
FIG. 1C shows a schematic, cross-section view of a portion of the magnetoresistive reader element 110 shown in FIG. 1A.
Figure 1B:
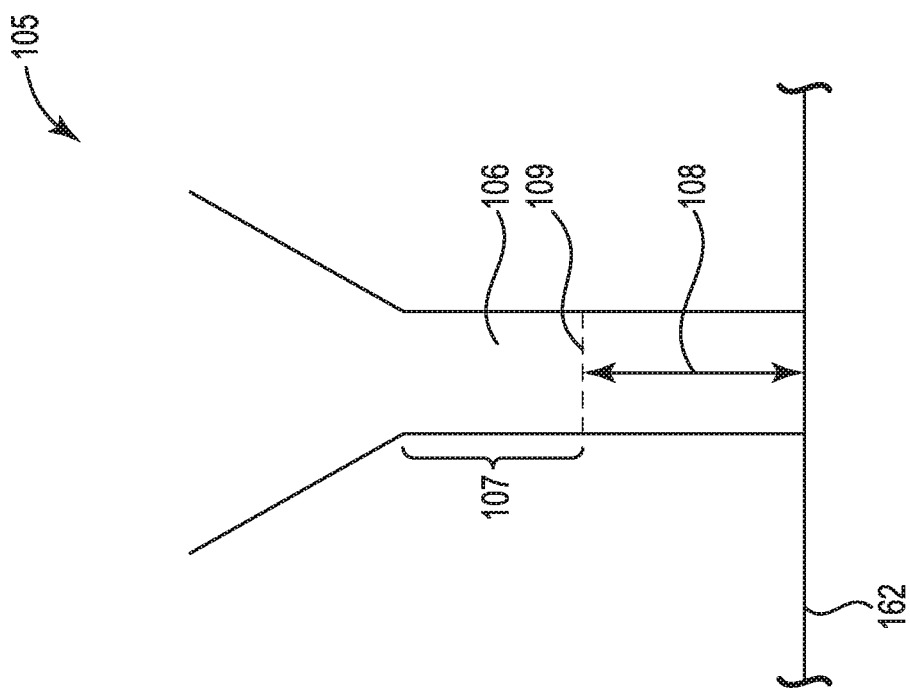
FIG. 1B shows a schematic, cross-section view of a portion of the magnetoresistive writer element 105 shown in FIG. 1A.

As shown in FIG. 1B, the magnetoresistive writer element 105 has a write pole 106 as a first feature that has a first distance 108 from a writer break point target position 109 as a first target value in the lapping direction. The writer break point distance 107 coincides with the writer break point target position 109 at the air bearing surface 162 after material is removed in the lapping direction by an amount represented by first distance 108.

As shown in FIG. 1C, the magnetoresistive reader element 110 has a reader stripe height 113 as a second feature that has a second distance 112 from a reader stripe height target position 114 as a second target value in the lapping direction. The reader stripe height 113 coincides with the reader stripe height target position 114 at the air bearing surface 162 after material is removed in the lapping direction by an amount represented by second distance 112.

Referring back FIG. 1A, as can be seen, there is a difference (delta) 120 between first distance 108 and second distance 112. That is, the distance 108 of the magnetoresistive writer element 105 from its writer break point target position 109 is different than the distance 112 of the magnetoresistive reader element 110 from its reader stripe height target position 114, thereby creating delta distance 120.

In some embodiments, the delta distance 120 is 50 nanometers or less. For example, delta distance 120 can be in the range from 0.1 nanometers to 40 nanometers, from 0.5 nanometers to 40 nanometers, or from 0.1 nanometers to 10 nanometers.

As explained above, according to the present disclosure, a heat source in the transducer region of a slider can be used to selectively expand an electronic feature (e.g., a writer) relative to another feature (e.g., a reader) within a given slider so that the expanded portion can be removed, thereby reducing or eliminating the delta distance 120.

Heat can be generated from a variety of electrical elements present in a transducer region of a slider. In some embodiments, the electrical element in the transducer region can be chosen from an electrical resistive heater, writer coils of a magnetoresistive write element, a laser/near field transducer (on-wafer laser), and combinations thereof.

As shown in FIG. 1, examples of electrical resistive heaters include one or more of writer electrical resistive heater 125 and reader electrical resistive heater 126. Writer electrical resistive heater 125 is located proximal to magnetoresistive writer element 105 and reader electrical resistive heater 126 is located proximal to magnetoresistive reader element 110. Writer electrical resistive heater 125 and/or reader electrical resistive heater 126 are examples of electrical resistive heaters that can be used during lapping according to present disclosure and during operation of a hard disc drive to adjust the distance between the writer and/or reader, respectively, and an underlying rotating disc.

In some embodiments, one or more optional electrical resistive heaters can be included that are dedicated to lapping operations. The one or more optional electrical resistive heaters can be located proximal to the feature that they are intended to selectively expand in the lapping direction. As shown in FIG. 1, the transducer region 101 includes an optional electrical resistive heater 128 that is also located proximal to magnetoresistive writer element 105. In use during lapping, as described below, the optional electrical resistance heating element 128 can be energized during lapping to cause the magnetoresistive writer element 105 to selectively expand relative to the magnetoresistive reader element 110 by an amount equal to delta distance 120, while the electrical resistance element 125 is not energized during lapping. In use during hard disc drive operation, the optional electrical resistance heating element 128 is not energized, but the electrical resistance element 125 can be energized to adjust the distance between the magnetoresistive writer element 105 and an underlying rotating disc (not shown).

Electrical resistive heaters (e.g., 125, 126, and 128) can be placed proximal to a magnetoresistive element so that it causes the magnetoresistive element to thermally expand in the "y" direction relative to another magnetoresistive element in the slider by a desired amount. For example, if writer electrical resistive heater 125 is energized to generate heat, it can cause the magnetoresistive writer element 105 to expand a first distance in the "y" direction. Further, when the writer electrical resistive heater 125 is energized to generate heat, it can also cause the magnetoresistive reader element 110 to expand a second distance in the "y" direction depending on the location of the writer electrical resistive heater 125 in the downtrack "z" direction. The ratio of the first distance to the second distance can be referred to as "gamma." In some embodiments in can be desirable to locate an electrical resistive heater (e.g., 125) proximal to its associated magnetoresistive element (e.g., 105) so that "gamma" is relatively high so that, e.g., writer electrical resistive heater 125 causes little to no expansion of the magnetoresistive reader element 110 in the "y" direction. In some embodiments, an electrical resistive heater (e.g., writer electrical resistive heater 125) is proximally located to its associated magnetoresistive element (e.g., magnetoresistive writer element 105) so that the heater is from 0.5 to 5 micrometers in the downtrack direction from the magnetoresistive element. In some embodiments, energizing an on-wafer-laser can be a desirable element to energize during lapping because it can relatively localize the heat that is generated thereby producing a relatively high and desirable "gamma."

In some embodiments, an electrical resistive heater can be located above the air bearing surface in the lapping direction "y" by a distance in the range from 1 to 10 micrometers.

In some embodiments, two or more sliders 111 in the row bar 100 have delta distances 120. In some embodiments, all sliders 111 in the row bar 100 have delta distances 120. Two or more delta distances 120 within a row bar 100 can have delta distances that are different from each other. In such cases, as described below, the present disclosure can apply an appropriate heat source to each individual slider to create a corresponding expansion by the appropriate delta distance in the lapping direction to remove the expanded material during lapping, thereby reducing or eliminating the delta distance among features within a given slider.

Embodiments of the present disclosure include applying a current to an element in the transducer region to generate heat and cause at least a first magnetoresistive element to expand in the lapping direction relative to at least a second magnetoresistive element. The current can be controlled to cause the first magnetoresistive element to heat up and expand in the lapping direction by an amount equal to the delta distance. The coefficient of thermal expansion of each of the different areas or elements within the area being heated can be taken into account when determining how much current to apply to the element that generates heat.

Figure 1D:
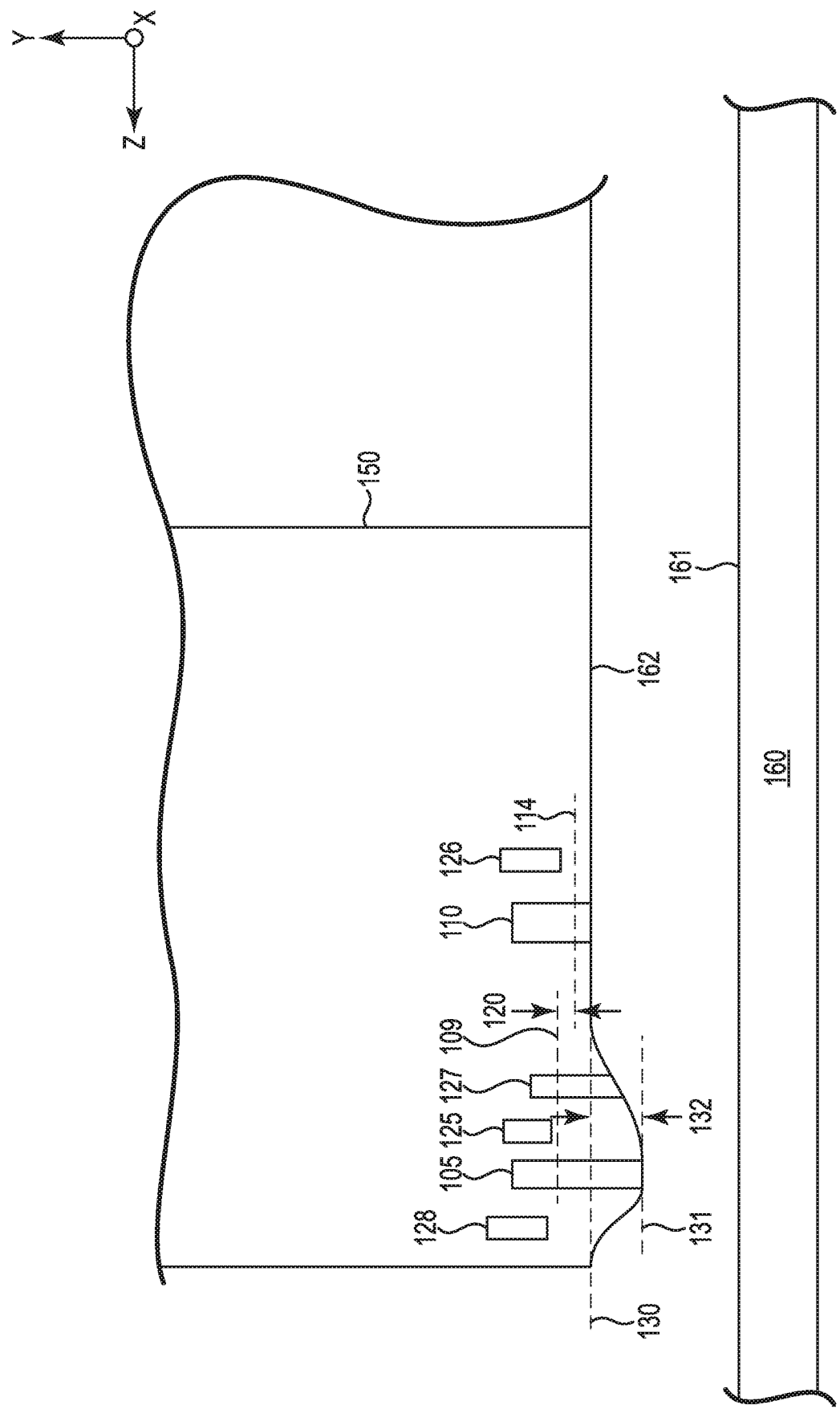
FIG. 1D shows a schematic, cross-section view of the portion of the slider shown in FIG. 1A when the writer electrical resistive heater 125 is energized.

An example of applying current to an element to cause an area to heat up and selectively expand during lapping is described with respect to FIGS. 1D-1G. The slider in FIG. 1A represents a slider 111 that has been through rough lapping. FIGS. 1D-1G represent various points in a kiss lapping process. Referring to FIG. 1D, a pre-determined current is applied to an element 125 in the transducer region 101 to generate heat and cause at least the first magnetoresistive element 105 to expand in the lapping direction relative to the second magnetoresistive element 110. The current can be adjusted and controlled to cause the first magnetoresistive element 105 to expand in the lapping direction an amount equal to the delta distance 132, which corresponds to delta distance 120 in FIG. 1A. As shown in FIG. 1D, delta distance 132 is the distance between reference line 130 and reference line 131. Reference line 130 is coplanar with air bearing surface 162. The amount of current to cause protrusion 132 can be determined from the heat generated from the element due to resistance heating and the coefficient of thermal expansion of the area that is heated. For example, referring to FIGS. 1D and 1E, an amount of current is applied to heater 125 to cause the area 117 to expand in the lapping direction "y" toward lapping plate 160. The coefficient of thermal expansion of the area 117 is taken into account to determine how much current to apply to heater 125 to expand magnetoresistive writer element 105 by a distance 132.

Figure 1G:
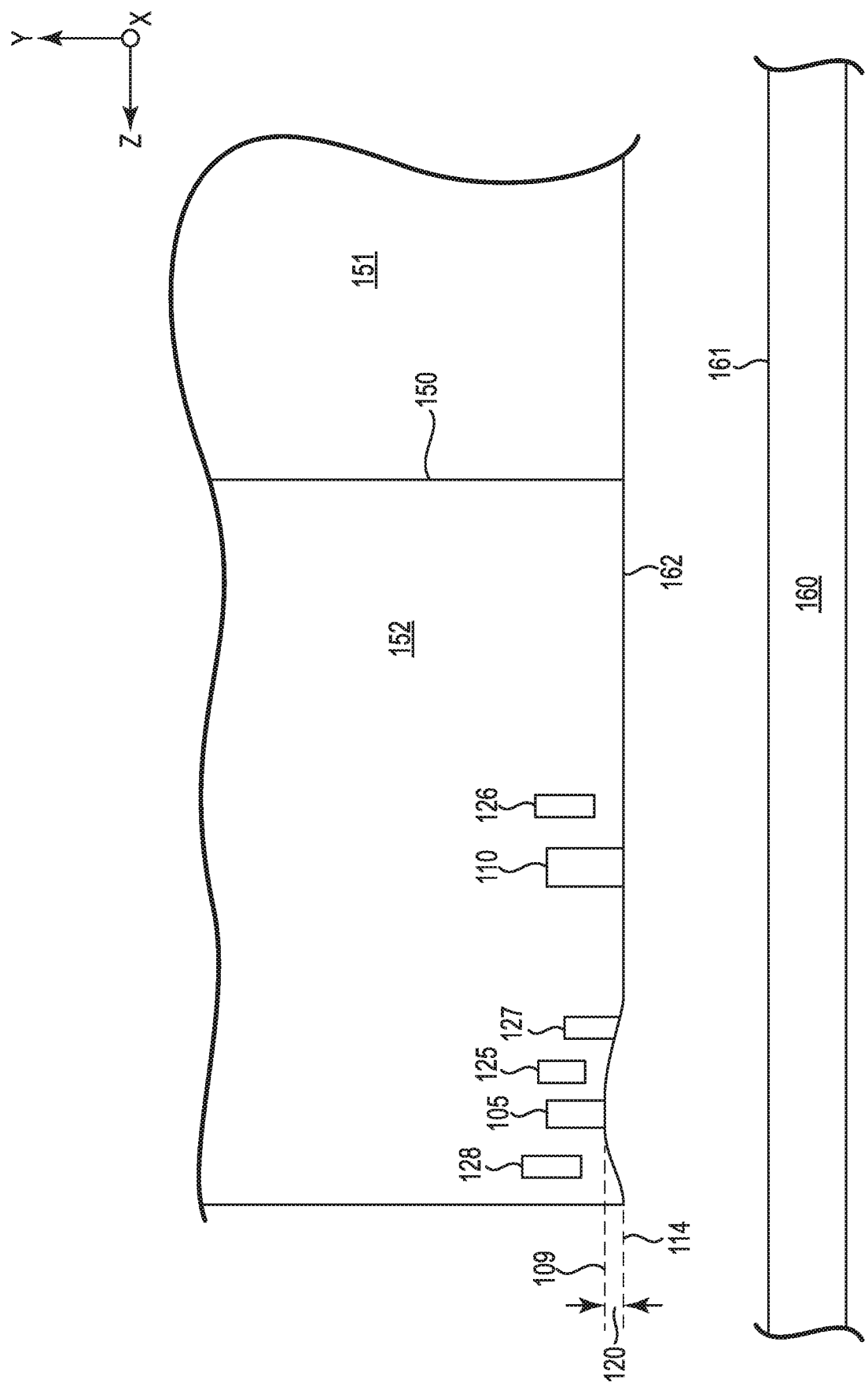
FIG. 1G shows a schematic, cross-section view of the portion of the slider shown in FIG. 1E when the writer electrical resistive heater 125 is no longer energized.

The row bar 111 can be caused to contact the rotating surface 161 of lapping plate 160 so that the expanded portion of the slider 111 can be removed, as shown in FIG. 1F, while applying the current. As also shown in FIG. 1F, the slider 111 has been lapped to planarize slider 111 so that the ABS 162 corresponds to the reader stripe height target position 114 of the magnetoresistive reader element 110. As shown in FIG. 1G, when the current is stopped so no heat is generated via heater 125, the area 117 cools down and recedes so that magnetoresistive writer element 105 recedes in the lapping direction "y" by a distance equal to delta distance 120. Thus, the air bearing surface 162 at the magnetoresistive writer element 105 now coincides with the writer break point target position 109. Accordingly, a degree of freedom can be introduced into the lapping process (e.g., kiss lapping process) by heating an element such as electrical resistance element 125. In some embodiments, a current can be applied to every slider in a row bar to cause the magnetoresistive writer element 105 in each slider 111 to expand in the lapping direction by an amount corresponding to the delta 120 of each slider 111. Thus, for every electrical resistance element 125 used during lapping as described above the same number of degrees of freedom can be introduced for that row bar 100. In some embodiments, a lapping system can connect a wire to the writer electrical resistive heater 125 on every head of every slider 111. Current can flow down one slider and up an adjacent slider, and any remaining current imbalance can be handled by a ground pad connection on first and last (dummy) sliders on every row bar.

In some embodiments, the one or more elements in each slider that are selected to electrically generate heat as described herein can be the only elements in the slider that are energized with current during lapping. For example, with respect to FIG. 1A, the writer electrical resistive heater 125 can be the only element in slider 111 that is energized with current during lapping while current is not applied to, e.g., the magnetoresistive writer element 105 and the magnetoresistive reader element 110 during lapping. As another example, the writer electrical resistive heater 125 and/or the writer coil of magnetoresistive writer element 105 can be energized with current to generate heat while current is not applied to, e.g., the magnetoresistive reader element 110 during lapping.

As described above, one or more sliders 111 in a row bar 100 can have a delta distance 120 that is different from a delta distance in one or more other sliders 111 in the row bar. As one example, each slider 111 in a row bar 100 could have a delta distance 120 that is different from the delta distance 120 in every other slider in the row bar 100. Because the delta distance 120 can vary among sliders in a row bar, the current that is applied to each individual heat generating element in each slider 111 (e.g., writer electrical resistive heater 125) can be different from the current applied to every other individual heat generating element in each corresponding slider 111 (e.g., writer electrical resistive heater 125).

In some embodiments, controlling kiss lapping to writer break point target position 109 can be performed with writer electrical resistive heater 125 and controlling kiss lapping to reader stripe height target position 114 can simultaneously be performed with an actuator arm of a mounting carrier. Examples of lapping carriers are described in U.S. Pat. No. 9,776,299 (Herendeen) and U.S. Pub. No. 2015/0258655 (Koon et al.), wherein the entireties of said patent documents are incorporated herein by reference. In some embodiments, controlling lapping to writer break point target position 109 and reader stripe height target position 114 can be performed in this manner for each slider 111 of a row bar. This corresponds to two degrees of freedom of lapping control for each slider 111. For example, if a row bar has 68 sliders, then using a writer electrical resistive heater and carrier actuator for the magnetoresistive writer element 105 and the magnetoresistive reader element 110, respectively, of each slider as described herein can provide at least 136 degrees of freedom for lapping control.

In some embodiments, before kiss lapping as described herein with respect to FIGS. 1A-1G, a magnetoresistive element such as magnetoresistive writer element 105 can be intentionally underlapped from the writer break point target position 109. In some embodiments, one or more magnetoresistive elements can be underlapped in the lapping direction by a distance from 0.5 to 10 nanometers. This can facilitate using a heat source according to the present disclosure to cause relative expansion among magnetoresistive elements and avoid overlapping the magnetoresistive element that is underlapped.

A variety of alternatives can be configured according to the present disclosure. For example, the reader electrical resistive heater 126 could be energized during lapping instead of writer electrical resistive heater 125. This way, the magnetoresistive reader element 110 could be caused to expand due to the heat generated by reader electrical resistive heater 126. Simultaneously and in conjunction, a carrier actuator could be used to physically actuate the slider 111 and control the writer break point target position 109 of magnetoresistive writer element 105.

In some embodiments, one or more electronic lapping guides (ELGs) can be used during lapping. An ELG has an electrical resistance that can change as conditions change. For example, the electrical resistance of an ELG can increase as ELG material is removed during a lapping process and thus may be used to monitor lapping of the air bearing surface 162 during slider 111 manufacturing. Accordingly, an ELG may be formed in a slider and the ELG resistance may be monitored during lapping. The resistance of an ELG can be correlated to material removed from an element that the ELG is associated with such as magnetoresistive writer element 105, magnetoresistive reader element 110, and/or a near-field transducer (not shown). Thus, the ELG can be used to target a desired dimension of the magnetoresistive writer element 105, the magnetoresistive reader element 110, and/or a near-field transducer. For example, an ELG can be used during lapping to target a height value for the magnetoresistive reader element 110 (e.g. reader stripe height target position 114) and another ELG can be used during lapping to target a height value for the magnetoresistive writer element 105 (e.g., writer break point target position 109). ELGs are also described in U.S. Pat. No. 7,551,406 (Thomas et al.), U.S. Pat. No. 7,643,250 (Araki et al.), U.S. Pat. No. 8,165,709 (Rudy), 2006/0168798 (Naka), and 2010/0208391 (Gokemeijer), wherein there entireties of said patent documents are incorporated herein by reference.

As shown in FIG. 1E, slider 111 includes a writer ELG 115 and a reader ELG 116.

Writer ELG 115 and reader ELG can each be located hundreds of microns away in the cross-track direction "x" from magnetoresistive writer element 105 and magnetoresistive reader element 110, respectively. During lapping, if writer electrical resistive heater 125 is used as described herein to expand slider 111 in the area 117 ("heat bubble"), then the writer ELG 115 can likewise be hundreds of microns outside of area 117. If the writer ELG 115 is located outside the area 117, then the writer ELG 115 may not provide the intended metrology with respect to magnetoresistive writer element 105 while magnetoresistive writer element 105 is expanding as shown in FIG. 1D. In some embodiments, one or thermal sensors can be located proximal (e.g., within area 117) to a given element being expanded (e.g., magnetoresistive writer element 105). Advantageously, a thermal sensor can provide desirable metrology information with respect to an element during lapping while the element is expanded due to heating. For example, a thermal sensor 127 can be located proximal to magnetoresistive writer element 105 within area 117. In some embodiments, a thermal sensor can be located within 0.5 to 5 micrometers in the downtrack "z" direction of its associated magnetoresistive element. A the thermal sensor can be located above the final air bearing surface in the lapping direction such that material is not removed from the thermal sensor during lapping as is the case with its associated magnetoresistive element. In some embodiments, a thermal sensor can be located above the air bearing surface in the lapping direction "y" by a distance in the range from 0.1 to 1 micrometers.

During lapping, while current is applied to writer electrical resistive heater 125 and heating area 117, the resistance of thermal sensor 127 can be measured. Temperature can be inferred from the measured resistance of thermal sensor 127. Then, the inferred temperature can be used to calculate the corresponding protrusion of magnetoresistive writer element 105 from a model that correlates temperature to protrusion of magnetoresistive writer element 105.

A non-limiting example of correlating temperature to protrusion of magnetoresistive writer element 105 is described herein below. A thermal sensor such as sensor 127 can be a thin sheet of resistive metal that can be used determine resistance vs temperature for the thermal sensor 127 either empirically or using a look-up table. An empirical approach can include raising and/or lowering the ambient temperature and measuring the resistance change of the sensor 127 in a row bar 100 as a function of temperature. Using a look-up table can include obtaining literature values from a look-up table for resistance change vs temperature for the material(s) used in this thermal sensor 127.

Also, a model for heater current or power vs temperature can be used. This can involve electrically connecting to a heater in a slider (e.g., a reader heater, a writer heater, or a dedicated lapping heater) and electrically connecting to a thermal sensor (e.g., sensor 127) in the slider. Next, the current or power delivered to the heater can be varied and the resistance of the thermal sensor 127 measured. Finally, the heater current or power can be plotted versus the resistance of thermal sensor 127. It is noted that this calibration method can be done while not lapping, because lapping may remove material from the thermal sensor and cause resistance to change. Also, calibration can be done with a row bar in contact with a static (non-rotating) lapping plate or without a row bar in contact with a lapping plate.

Finally, correlating temperature to protrusion of magnetoresistive writer element 105 can include a model for temperature vs protrusion of a writer or reader. Commercially available software packages are available like COMSOL Multiphysics® software that can be used to model the protrusion profiles of a writer or reader while an electrical heater is used at different power settings. Empirical modeling can be performed by electrically connecting to a heater, lapping bars under under a range of heater currents/ powers, and then measuring the height profiles for a reader and a writer protrusion using either an atomic force microscope or with an optical profilometer.

One non-limiting example of a thermal sensor 127 is referred to as a dual-ended temperature coefficient of resistance sensor (DETCR). An example of a DETCR is described in U.S. Pat. No. 8,638,349 (Liu et al.), wherein the entirety of said patent document is incorporated herein by reference. Another non-limiting example of a thermal sensor 127 includes a thermal asperity detector (TAD). An example of a TAD is described in U.S. Pub. No. 2003/0065992 (Yang), wherein the entirety of said patent document is incorporated herein by reference.

In some embodiments, the temperature of a row bar 111 can unintentionally fluctuate due to one or more factors such as frictional heating due to lapping, the temperature of the surrounding environment. Such fluctuations may cause the elements that are heated to expand (e.g., e.g., the magnetoresistive writer element 105 and the magnetoresistive reader element 110) more or less than intended. Also, such fluctuations in temperature can increase or decrease the resistance detected in an ELG, which can indicate an incorrect amount of material that is lapped away from the ELG and corresponding element. A lapping plate having a temperature control system can help control the temperature of the a row bar in physical contact with the lapping place so as to reduce or substantially eliminate such temperature fluctuations. An example of such a temperature control system is described in patent application titled "A LAPPING SYSTEM THAT INCLUDES A LAPPING PLATE TEMPERATURE CONTROL SYSTEM, AND RELATED METHODS" by Habermas et al. application Ser. No. 62/686,417 filed on Jun. 18, 2018, wherein the entirety of said patent application is incorporated herein by reference.

Figure 2:
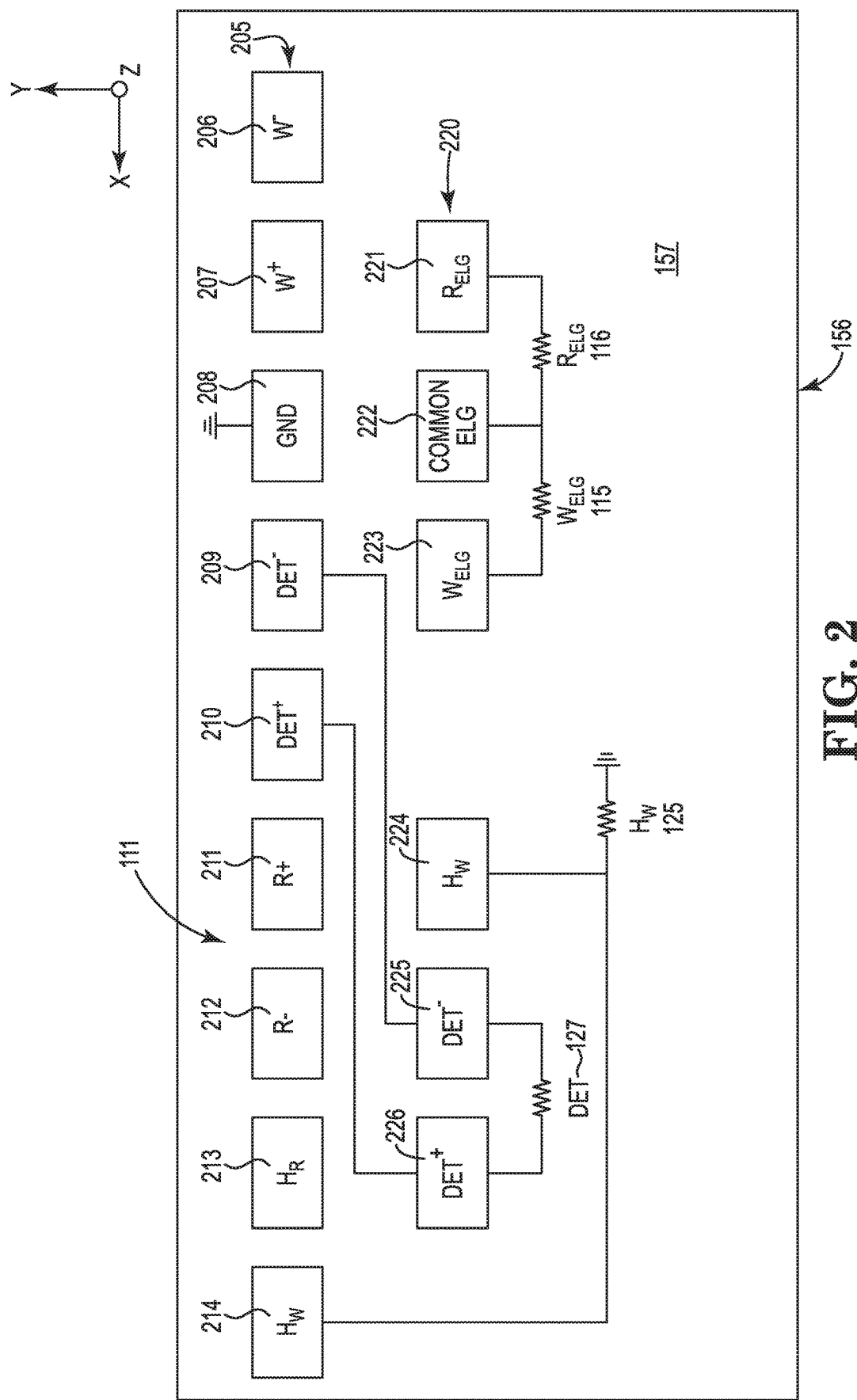
FIG. 2 is a schematic, cross-section view of a portion of the slider shown in FIG. 1A that includes electrical contact pads.

In order to electronically access slider elements (e.g., magnetoresistive writer element 105, etc.), a slider can include a plurality of electrical contact pads that may be electrically connected to the slider elements. FIG. 2 is a schematic that shows the trailing edge face 157 of slider 111. The contact pads illustrated are present on the trailing edge face. FIG. 2 also includes an electrical wiring diagram showing how the contact pads are electrically connected to devices such as ELGs, writer heater, DETCR. and the like. As shown in FIG. 2, slider 111 includes a first row 205 of electrical contact pads along the cross track axis "x" and a second row 220 of electrical contact pads along the cross track axis "x". The first row 205 of contact pads include a ground contact pad 208 and can be electrically connected to features used during head-gimbal assembly (HGA) operation in a hard disk drive (HDD). The second row 220 of electrical contact pads can be dedicated for use of features used during lapping according to the present disclosure. That way, electrical connections can be made to the second row 220 of electrical contact pads and then after lapping is done, the second row 220 of electrical contact pads can just be left unused, thereby leaving the first row 205 of electrical contact pads in relatively good condition. For example, the first row 205 of electrical contact pads can avoid having undue scratching or any remnants of wire bonds from the lapping process.

In more detail, with reference to the slider 111 illustrated in FIGS. 1A-1G, electrical contact pads 206 and 207 can be electrically connected to magnetoresistive writer element 105 and electrical contact pads 211 and 212 can be electrically connected to magnetoresistive reader element 110. Reader electrical resistive heater 126 can be electrically connected to electrical contact pad 213.

With respect to the slider 111 elements used during lapping as described herein, writer ELG 115 can be electrically connected to electrical contact pads 222 and 223 and reader ELG 116 can be electrically connected to electrical contact pads 221 and 222. Advantageously, writer ELG 115 and reader ELG 116 can share a common electrical contact pad 222 to save space in the second row 220 of electrical contact pads.

Also, thermal sensor 127 (e.g., DETCR) can be electrically connected to electrical contact pads 225 and 226 in the second row 220, which can be electrically connected to electrical contact pads 209 and 210, respectively, in the first row 205. Finally, writer electrical resistive heater 125 can be electrically connected to electrical contact pad 224 in the second row 220 and electrical contact pad 214 in the first row 205. This way, electrical connections can be made to electrical contact pads in the second row 220 for lapping purposes, thereby avoiding undue scratching and/or remnants of wire bonds on electrical contact pads in the first row 205.

Electrical contact pads can be made out a variety of conductive materials such as gold and the like. Elements can be electrically connected to contact pads via bonding, soldering, or other electrical connection. For example, gold wire can be used to electrically connect a contact pad to an element.

What is claimed is:

1. A method of lapping a row bar having a plurality of sliders, wherein the method comprises:
    a) providing the row bar having a plurality of sliders, wherein at least one slider comprises a transducer region comprising: at least a first magnetoresistive element and a second magnetoresistive element, wherein the first magnetoresistive element has a first feature that has a first distance from a first target value in a lapping direction and the second magnetoresistive element has a second feature that has a second distance from a second target value in the lapping direction, wherein the first distance minus the second distance is equal to a delta distance; and
    b) applying a current to an element in the transducer region to generate heat and cause at least the first magnetoresistive element to expand in the lapping direction relative to the second magnetoresistive element, wherein the current is controlled to cause the first magnetoresistive element to expand in the lapping direction an amount equal to the delta distance; and
    c) lapping the row bar while applying the current.

2. The method of claim 1, wherein the delta distance is in a range from 0.5 to 50 nanometers.

3. The method of claim 1, wherein every slider in the row bar comprises: at least a first magnetoresistive element and a second magnetoresistive element, wherein the first magnetoresistive element in each slider has a first feature that is a first distance from a first target value in the lapping direction and the second magnetoresistive element in each slider has a second feature that is a second distance from a second target value in the lapping direction, wherein the first distance minus the second distance is equal to a delta distance; and
wherein current is applied to an element in a transducer region of each slider in the row bar to generate heat and cause at least the first magnetoresistive element in each slider to expand in the lapping direction relative to the second magnetoresistive element in each corresponding slider, wherein the current is controlled to cause the first magnetoresistive element in each slider to expand in the lapping direction an amount equal to the delta distance in the corresponding slider.

4. The method of claim 1, wherein the element is chosen from an electrical resistance heating element, a magnetoresistive write element, an on-wafer laser, and combinations thereof.

5. The method of claim 1, wherein the element comprises at least one electrical resistance heating element located proximal to the first magnetoresistive element.

6. The method of claim 5, wherein the transducer region comprises a first electrical resistance heating element located proximal to the first magnetoresistive element and a second electrical resistance heating element located proximal to the first magnetoresistive element, wherein the first electrical resistance heating element is energized during lapping and the second electrical resistance element is not energized during lapping, and wherein the first electrical resistance heating element is not energized during read/write operation and the second electrical resistance element is energized during read/write operation.

7. The method of claim 1, wherein every slider in the row bar comprises:
    a) at least a first magnetoresistive element and a second magnetoresistive element, wherein the first magnetoresistive element has a first feature that is a first distance from a first target value in the lapping direction and the second magnetoresistive element has a second feature that is a second distance from a second target value in the lapping direction, wherein the first distance minus the second distance is equal to a delta distance; and
    b) at least one electrical resistance heating element located proximal to the first magnetoresistive element, wherein current is applied to each electrical resistance heating element in each slider to generate heat and cause at least the first magnetoresistive element in each slider to expand in the lapping direction relative to the second magnetoresistive element in each corresponding slider, wherein the current is controlled to cause the first magnetoresistive element in each slider to expand in the lapping direction an amount equal to the delta distance in the corresponding slider.

8. The method of claim 7, wherein at least two sliders in the row bar have different delta distances.

9. The method of claim 8, wherein the current applied to the electrical resistance heating element in one slider is different than the current applied to the electrical resistance heating element for at least one other slider.

10. The method of claim 1, wherein the first magnetoresistive element is a magnetoresistive writer element and the first feature is a writer break point, and wherein the second magnetoresistive element is a magnetoresistive reader element and the second feature is a reader stripe height.

11. The method of claim 1, wherein the lapping comprises fine lapping, and wherein prior to step (a) the row bar is subjected to a rough lapping process that underlaps the first magnetoresistive element in the lapping direction in an amount from 0.5 to 10 nanometers.

12. The method of claim 1, wherein the transducer region further comprises at least one thermal sensor located proximal to the element and wherein the method further comprises:
   a) measuring a resistance of the thermal sensor while applying the current to the element;
   b) comparing the measured resistance of the thermal sensor to the applied current; and
   c) determining the first distance from target value of the first feature of the first magnetoresistive element.

13. The method of claim 1, wherein the row bar is mounted in a carrier structure, wherein the carrier structure comprises a mechanical member for each slider, wherein each mechanical member is configured to physically contact the row bar and actuate a corresponding slider in a lapping direction while applying the current and lapping the row bar.

14. The method of claim 1, wherein current is not applied to the first and second magnetoresistive elements during lapping.

15. The method of claim 1, wherein the at least one slider further comprises a first row of a plurality of electrical contact pads and a second row of a plurality of electrical contact pads, wherein the first row of electrical contact pads extends along a crosstrack direction at a first position in the lapping direction, wherein the second row of electrical contact pads extends along the crosstrack direction at a second position in the lapping direction, wherein the element is electrically coupled to at least one electrical contact pad in the second row.

* * * * *